(12) United States Patent
Demulder et al.

(10) Patent No.: US 10,372,466 B2
(45) Date of Patent: Aug. 6, 2019

(54) RULE-BASED MONITORING ENGINE WITH TRACING CAPABILITIES FOR MULTI-THREADED LOGGING

(71) Applicant: Western Digital Technologies, Inc., San Jose, CA (US)

(72) Inventors: Timothy Demulder, Zwijnaarde (BE); Ruben De Zaeytijd, Kluisbergen (BE)

(73) Assignee: Western Digital Technologies, Inc., San Jose, CA (US)

( * ) Notice: Subject to any disclaimer, the term of this patent is extended or adjusted under 35 U.S.C. 154(b) by 15 days.

(21) Appl. No.: 15/621,901

(22) Filed: Jun. 13, 2017

(65) Prior Publication Data
US 2018/0357079 A1 Dec. 13, 2018

(51) Int. Cl.
| | |
|---|---|
| *G06F 9/445* | (2018.01) |
| *G06F 21/51* | (2013.01) |
| *G06F 9/38* | (2018.01) |
| *G06F 9/54* | (2006.01) |
| *G06F 11/34* | (2006.01) |
| *G06F 11/30* | (2006.01) |

(52) U.S. Cl.
CPC ........ *G06F 9/44526* (2013.01); *G06F 9/3859* (2013.01); *G06F 9/541* (2013.01); *G06F 11/302* (2013.01); *G06F 11/3006* (2013.01); *G06F 11/3089* (2013.01); *G06F 11/3476* (2013.01); *G06F 21/51* (2013.01); *G06F 2201/865* (2013.01)

(58) Field of Classification Search
CPC .... G06F 9/44526; G06F 9/3859; G06F 9/541; G06F 21/51
See application file for complete search history.

(56) References Cited

U.S. PATENT DOCUMENTS

| | | | |
|---|---|---|---|
| 7,222,114 B1 * | 5/2007 | Chan ...................... | G06N 5/025 706/14 |
| 2007/0168919 A1 | 7/2007 | Henseler et al. | |
| 2012/0185911 A1 * | 7/2012 | Polite .................. | G06F 21/6218 726/1 |

(Continued)

FOREIGN PATENT DOCUMENTS

WO    2016175851 A1    11/2016

OTHER PUBLICATIONS

Nagios "The Beginners Guide to Nagios XI" dated Apr. 30, 2015, 25 pages.

(Continued)

*Primary Examiner* — Timothy A Mudrick
*Assistant Examiner* — Abdou K Seye
(74) *Attorney, Agent, or Firm* — Patent Law Works LLP

(57) ABSTRACT

A system and method embodied in a monitoring engine configured to create plug-ins to define functionality including rule-based configuration syntax adapted to intuitively and automatically launch the plug-ins as necessary in a software-based infrastructure or environment. The monitoring engine also includes a capability for tracing multi-threaded asynchronous logging onto a single file, by assigning a unique identification to each thread or rule initiated and facilitating each log according to a specific format and to formulate a combination of all the different thread identifications into a master unique identification that is easily traceable through an entire log file.

20 Claims, 10 Drawing Sheets

(56) References Cited

U.S. PATENT DOCUMENTS

2015/0339210 A1   11/2015  Kopp et al.
2016/0036985 A1    2/2016  Koren et al.
2016/0124783 A1    5/2016  Puvvada et al.

OTHER PUBLICATIONS

Wikipedia "Cron" dated Oct. 8, 2015, 7 pages.
International Search Report & Written Opinions of International Application No. PCT/US2018/020815, dated Aug. 21, 2018, pp. 1-15.

* cited by examiner

RULE-BASED MONITORING ENGINE WITH TRACING CAPABILITIES FOR MULTI-THREADED LOGGING

BACKGROUND

The present disclosure relates to systems and methods implemented in a monitoring engine configured with plug-ins to define functionality including rule-based configuration syntax adapted to intuitively and automatically deploy or launch the plug-ins as necessary in any software environment that requires a monitoring agent or daemon, a cloud infrastructure or the like. The present disclosure also relates to tracing multi-threaded asynchronous logging to a single file, by assigning a unique identification to each thread or process initiated and facilitating each logging according to a specific format to formulate a combination of all the different thread identifications into a master unique identification that is easily traceable through an entire log file.

Typically, monitoring agents and engines are intelligent agent software that is used to observe and report on computer equipment or operations of complex computer networks. Monitoring engines may be used in any software-based environment or cloud infrastructure to monitor particular functionalities and applications. For example, organizations deploying cloud-computing services use monitoring tools to ensure that these services are operating smoothly. Existing monitoring agent designs are inflexible or do not permit those who have little programming knowledge to either quickly or easily come up with new monitoring functionality to monitor a particular operation within the cloud infrastructure because the actual functionality is tied to the monitoring engine code.

Further, in a cloud infrastructure environment, multi-threading is common practice in multitasking operating systems. Multithreading as a widespread programming and execution technique allows multiple threads to exist within the context of one process or operation that is being performed. These multiple threads share resources (hardware and software), yet execute independently. This multithreading technology when applied to a single process enables parallel execution on a multiprocessor system. A single process may have many different functions executing concurrently, allowing the application to better use the available hardware (multiple cores/processors). By this, threads can communicate between them, as they share the same memory. A significant problem that often arises in this situation is that every thread does not function in the same way when accessing shared objects and memory. Thus, although threading certainly helps with addressing complex, lengthy, independent problems, it introduces complexity in the operations, including use of multiple personal-identification numbers and internal-thread names. Multi-threaded asynchronous logging to a single file can be difficult to untangle as the log messages are serialized in the actual file, but the source, if not always clear, for identifying time and order or logged events, becomes complicated and it becomes even more difficult when the child thread itself forks other processes.

The present disclosure solves problems associated with ineffective monitoring engines used in a cloud infrastructure, by providing a flexible platform capable of separating the actual engine from the functionality providers, i.e., the plug-ins, by making the plug-ins easily configurable for any particular functionality desired or for other new functionalities by defining functionality from a predetermined rule-based program. The present disclosure also solves the complexities of troubleshooting multi-threaded processes, by assigning, a unique identification to each thread, process, or step of a rule and providing a logging interface in a specific format, so that the combination of all the identification numbers for the various threads or processes formulate a combined and unique identification, that is easily traceable through the entire log file.

SUMMARY

According to one innovative aspect of the subject matter described in this disclosure, a monitoring engine created for use in a cloud infrastructure is configurable and executable with simple plug-ins (otherwise also referred to as plugins, add-ons, or extensions) that define functionality and use simple rule-based configuration syntax to launch or deploy the plug-ins in an intuitive way. The writing instructions for this monitoring functionality are reduced to simply creating at least two plug-ins (e.g., a checker and an action plug-in) and using them in a rule. The present invention also solves the complexities of troubleshooting multi-threaded processes in a cloud infrastructure, by assigning a unique identification to each thread or process and providing a logging interface in a specific format so that the combination of all the identification numbers for the various threads or processes (rules) formulate a combined, unique identification that is easily traceable through the entire log file and may be easily comprehended.

According to another innovative aspect of the subject matter in this disclosure, the monitoring engine defines three plug-in categories, namely, checkers, validators, and actions and adds or installs a plug-in for each category. In some embodiments, the checker plug-in is tasked to return a certain value. In some embodiments, the validator plug-in is tasked to accept a value coming from a checker, compare it to something else, and return the status of the validation. In some embodiments, the action plug-in is tasked with performing a task. The plug-ins serve in a rule that is configured to follow a simple syntax: 'checker' 'operator' 'validator': 'action0', 'action1' . . . . This means when this rule is deployed or launched, the monitoring engine launches an instance of 'checker' and compares the returned value from the checker to 'validator', and if the result of the 'checker' 'operator' 'validator' is true, the engine launches the corresponding tasks (multiple actions defined by a single rule), e.g., 'action0', 'action1' and if the result of the first part is false, the engine does not launch the tasks. In some embodiments, the 'validator' field may be configured as a static value.

In accordance with yet another innovative aspect of the present invention, multi-threaded asynchronous logging is tracked or traced by the rule-based system configured with the specific plug-in based rule system (implemented in the monitoring engine), by which each step in the rule is accorded a unique ID, and a combination of the three IDs is generated to formulate a unique ID that is specific to a particular rule run (otherwise referred to as a process, operation, or step). Other runs or steps using the same code may yield other IDs, making the multi-threaded process easy to follow. Although the threads all log to the same file in the non-linear fashion, the flow of events may be logically followed with ease by looking at the combined ID in the log file.

In some embodiments, the monitoring and tracing system of the present invention may include a processor and memory storing instructions executable by the processor 1) to execute an application program interface to operate a monitoring engine configured to monitor a particular functionality within a software-based environment or cloud infrastructure based on a rule-based configuration, and configured 2) to define three separate categories of plug-ins to use the plug-ins in rules, the plug-ins including a checker plug-in to return a value output, a validator plug-in to receive the value output and compare the value output to a threshold standard and return a status of a validation operation performed by the validator plug-in, and one or more action plug-ins configured to perform tasks after the validation operation.

Other innovative aspects include corresponding systems, methods, apparatus, and computer program products.

It should be understood that language used in the present disclosure has been principally selected for readability and instructional purposes and not to limit the scope of the subject matter disclosed herein.

BRIEF DESCRIPTION OF THE DRAWINGS

The present disclosure is illustrated by way of example, and not by way of limitation, in the figures of the accompanying drawings in which like reference numerals are used to refer to similar elements.

DETAILED DESCRIPTION

System and method architecture of a monitoring engine and functionalities for tracing of multi-threaded logging, e.g., implemented in an application program interface for interaction with a cloud infrastructure are described below. Although the systems and methods of the present disclosure are described in the context of particular system architectures that are illustrated, it should be understood that the systems and methods may be applied to other architectures and organizations of hardware with similar properties.

It should be understood that the present disclosure addresses the problem of existing monitoring agent designs that do not permit those with little programming knowledge to either quickly or easily come up with new monitoring functionality to monitor operations in a software-based environment or cloud architecture as the actual functionality is too tied in with the actual monitoring engine code base. The present disclosure also solves the complexities of multi-threaded processing, by assigning, a unique identification to each thread or process and providing a logging interface in a specific format, so that the combination of all the identification numbers for the various threads or processes formulate a big, unique identification, that is easily traceable through the entire log file.

For purposes of this disclosure, it should be understood that a plug-in refers to a software component that adds a specific feature or element to an existing computer program or structure. A plug-in may also be referred to as a plugin, an add-on, extension, or supplement. Plug-in applications typically are programs that may be easily installed and used as part an existing program. In addition, an application program interface (API) is a set of routines, protocols, and tools for building software applications for use with existing software/hardware structure or architecture (e.g. a cloud infrastructure). An application program interface (API) specifies how software components should interact with the existing architecture. A cloud infrastructure includes a network of remote servers hosted on the internet or a cloud product that is created to operate on a customer's premises to store, manage, and process data, to provide large-scale virtual resources. Cloud architecture typically provides cloud services that have several layers, namely, client, applications that are software-as-a-service (SaaS), platforms or platforms-as-a-service (PaaS), cloud infrastructure or cloud infrastructure-as-a-service (IaaS), and servers. Each of these layers or categories in a cloud serves a different purpose and offers different products for businesses and individuals around the world.

Figure 1:
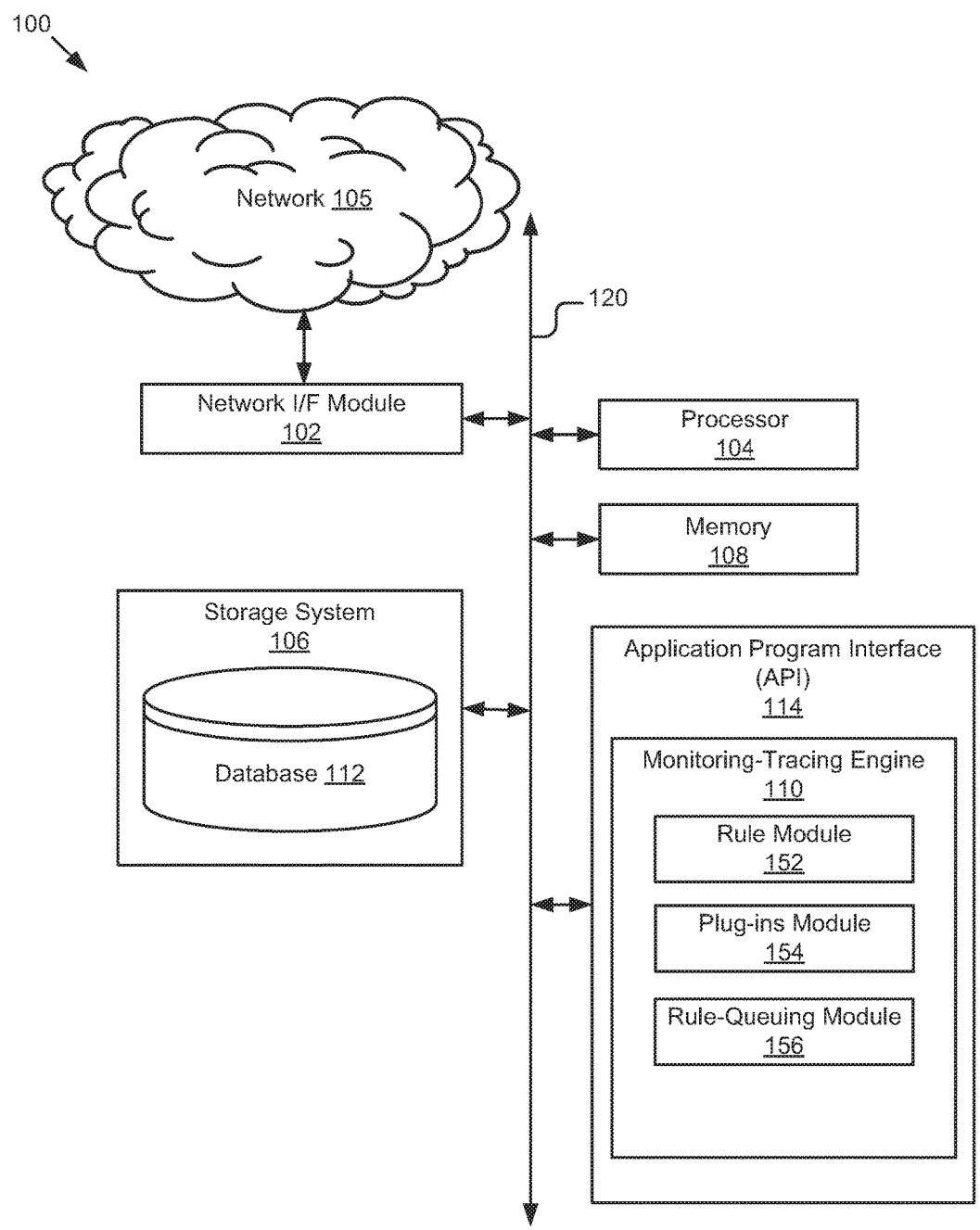
FIG. 1 is a high-level block diagram illustrating an application program interface (API) to a cloud infrastructure in accordance with the present invention including a rule-based monitoring engine and functionality for tracing multi-threaded asynchronous logging to a single file.

Referring now to FIG. 1, it should be recognized that FIG. 1 is a block diagram illustrating an example system 100 with an application program interface (API) configured to interact with a cloud infrastructure. A monitoring-tracing engine 110 is illustrated that is rule-based and has a capability that traces multi-threaded logging into a file in the cloud infrastructure. The example system 100 may include a network interface (I/F) module 102 configured to connect with a cloud infrastructure via a network 105, a processor 104, a storage system 106 with a database 112, a memory 108, and an Application Program Interface (API) 114 with a monitoring-tracing engine 110 that has a rule module 152, a plug-ins module 154, and a rule-queuing module 156. The components of the system 100 are communicatively coupled to a bus or software communication mechanism 120 for communication with each other.

The example system 100 has an application program interface (API) 114 configured to access a cloud architecture (via the network 105) and to perform specific functions or operations (also referred to here as operations or runs) within the cloud architecture. The application program interface 114 has a monitoring-tracing engine 110, which is configured with plug-ins to define functionality including rule-based configuration syntax adapted to intuitively and automatically deploy or launch the plug-ins as necessary in a cloud infrastructure. The monitoring-tracing engine 110 is also configured to trace multi-threaded asynchronous logging to a single file within a cloud infrastructure, by assigning a unique identification to each thread or process initiated for a rule (e.g. validation) and facilitating each logging according to a specific format to formulate a combination of all the different thread identifications into a master or combined unique identification that is easily traceable through an entire log file. (e.g., to record all access and operation data). The monitoring-tracing engine 110 has a rule module 152, by which a particular rule is either identified or defined. The plug-ins module 154 is adapted to deploy a rule-based plug-in into the cloud infrastructure to perform monitoring tasks. The rule-queuing module 156 tracks the rule employed and the process or thread that relates to the rule (by asynchronous logging into a file). In some instances, each server within the cloud infrastructure may run its own monitoring-tracing engine 110 to operate local monitoring functions within each server. Each such monitoring-tracing engine 110 exposes an API of each server, allowing it to remotely trigger, request, or otherwise interact with the server's local monitoring-tracing engine 110.

In some implementations, software communication mechanism 120 may be an object bus (e.g., Common Object Request Broker Architecture (CORBA)), direct socket communication (e.g., Transmission Control Protocol (TCP)/Internet Protocol (IP) sockets) among software modules, remote procedure calls, User Datagram Protocol (UDP) broadcasts and receipts, HTTP connections, function or procedure calls, etc. Further, any or all of the communication could be secure (Secure Shell (SSH), Hypertext Transfer Protocol Secure (HTTPS), etc.). The software communication mechanism 120 can be implemented on any underlying hardware (for example, a network, the Internet, a bus, a combination thereof, etc.).

The network interface (I/F) module 102 is configured to connect system 100 to a network and/or other system, for example a network 105 coupled to a cloud infrastructure. For example, network interface module 102 may enable communication through one or more of the Internet, cable networks, and other wired networks. The network interface module 102 links the processor 104 to a network that may in turn be coupled to other processing systems. The network interface module 102 also provides other conventional connections to the network 120 for distribution and/or retrieval of files and/or media objects using standard network protocols such as TCP/IP, HTTP, HTTPS and Simple Mail Transfer Protocol (SMTP) as will be understood. In some implementations, the network interface module 102 includes a transceiver for sending and receiving signals using Wi-Fi, Bluetooth®, or cellular communications for wireless communication.

The network interface module 102 may allow client and/or server devices to store data to and retrieve data from the storage system 106 (for example, across the network 120). For example, the network interface module 102 may allow one or more components of the system 100 to act as network accessed storage or as an array of storage devices.

The network 105 may be one of a conventional type, wired or wireless, and may have numerous different configurations including a star configuration, token ring configuration, or other configurations. Furthermore, the network may include a local area network (LAN), a wide area network (WAN) (e.g., the Internet), and/or other interconnected data paths across which multiple devices may communicate. In some implementations, the network may be a peer-to-peer network. The network may also be coupled with or include portions of a telecommunications network for sending data using a variety of different communication protocols. In some implementations, the network may include Bluetooth (or Bluetooth low energy) communication networks or a cellular communications network for sending and receiving data including via short messaging service (SMS), multimedia messaging service (MMS), hypertext transfer protocol (HTTP), direct data connection, Wireless Application Protocol (WAP), email, etc.

The processor 104 may include an arithmetic logic unit, a microprocessor, a general-purpose controller or some other processor array configured to perform computations and provide electronic display signals to a display device in accordance with the present invention. In some implementations, the processor 104 is a hardware processor having one or more processing cores. The processor 104 is coupled to the bus 120 for communication with the other components of system 100. The processor 104 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 1, multiple processors and/or processing cores may be included. It should be understood that other processor configurations are also possible.

The storage system 106 is a data storage system that may store information on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks of hard disk drives (HDDs). The storage device(s) of the storage system 106 may be included in one or more enclosures housed in the same location or physically distributed to disparate locations across a storage area network. The storage system comprises a database 112 and storage logic of the storage system 106 can provide computing functionalities, services, and/or resources to send, receive, read, write, and transform data from other entities of the system 100. In some embodiments, the storage logic can be a computing device configured to make a portion or all of the storage space available on the storage system 106. The storage logic is coupled to a switch for communication and cooperation with the storage system 106 and the database 112 of the system 100. In other embodiments, the storage logic transmits data between the storage system 106 and the memory 108 via the switch 118. It should be recognized that multiple storage logic units may be utilized, either in a distributed architecture or otherwise. For the purpose of this application, the system configuration and operations performed by the system are described in the context of a single storage logic and storage system 106.

The switch used in the storage system 106 may be a conventional type, wired, and may have numerous different configurations. Furthermore, the switch 118 may include an Ethernet, InfiniBand, Peripheral Component Interconnect Express (PCI-Express) switch, and/or other interconnected data path switches, across which multiple devices (e.g., storage devices 122) may communicate. Although the example of FIG. 1 illustrates a single storage system 106, in practice one or a plurality of storage systems 106 can connect the entities.

The storage system 106 may include a non-transitory computer-usable (e.g., readable, writeable, etc.) medium, which may be any non-transitory apparatus or device that can contain, store, communicate, propagate or transport instructions, data, computer programs, software, code routines, etc., for processing by or in connection with a processor. In some embodiments, the storage system 106 communicates and cooperates with the storage logic by switch. The storage system 106 may be flash memory or may include a volatile memory such as a dynamic random access memory (DRAM) device, a static random access memory (SRAM) device, or some other memory devices.

The memory 108 stores instructions and/or data that may be executed by the processor 104. The memory 108 is coupled to the bus 120 for communication with the other components of the system 100. The instructions and/or data stored in the memory 108 may include code for performing any and/or all of the techniques described herein. The memory 108 may be, for example, volatile memory such as a dynamic random access memory (DRAM) device, a static random access memory (SRAM) device, or some other volatile memory device. In some implementations, the memory 108 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device. In some implementations, the memory 108 may store the data for the Application Program Interface (API) 114 and executable code to perform its functionalities.

Figure 2:
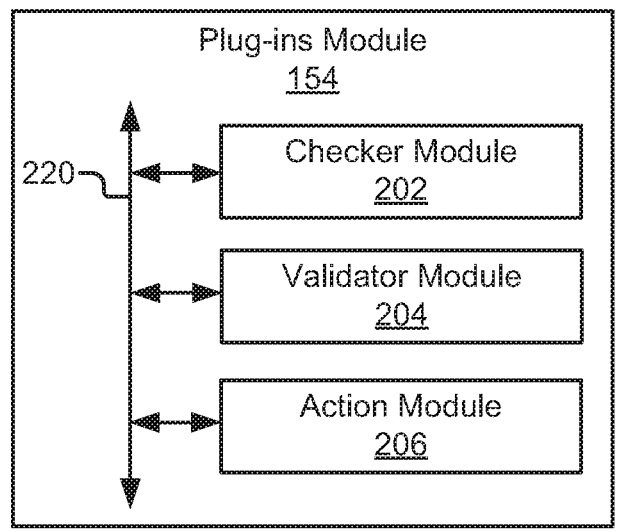
FIG. 2 is a block diagram illustrating an example plug-ins module within the monitoring engine of the Application Program Interface (API).

Referring now to FIGS. 1 and 2, the monitoring-tracing engine 110 has a plug-ins module 154 for monitoring related scripts and a configuration file separation software for packaging separate files. The plug-ins module 154 has a single purpose and targets a single function, therefore, leaves a small footprint when it deploys a plug-in. The plug-ins module 154 defines plug-ins that are easy to write and support. The plug-ins module 154 has three components—checker, validator, and action. The checker plug-in or module 202 checks a function within the cloud infrastructure and returns its status/result. An example routine performed by the checker module 202 is illustrated below.

Example check: 'is A running?'
Returns: True
Check: 'how much disk space is in use on sda (in %)?'
Returns: 80

The plug-ins module 154 includes a validator plug-in or module 204 configured to receive a result generated by the checker module 202 and validate the result and return the status of the validation.

Example receives '80' (from the disk checker)
validates it's bigger than '75' (arbitrary value)
returns True The plug-ins module 154 executes a single line per rule, and with multiple rules uses the same checker function (by the checker module 202) and has a fixed format. An example is illustrated below:
Format:
<checker> <op> <validator>:<action 0>, <action 1>, . . . .

Example ch_disk.=va_disk:remove_home_oostj
ch_disk>=80:remove_home_oostj,raise_event In a multi-threaded application, every plug-in runs in its own thread and there is no blocking of the processor 104 or of the IO or Network I/F module 102. There is no long-running plug-in, and there is action plug-in collision detection. Furthermore, there is a single run of all plug-ins (persistent) and a multiple queuing system that can survive sudden read-only file systems.

In some scenarios, a REST-like API interface may control the monitoring-tracing engine 110 remotely and launch individual plug-ins and/or individual or multiple rules by the plugins module 154, and retrieves results from the operations that are performed by the individual plug-ins.

Referring now to FIG. 2, it should be recognized that the monitoring-tracing engine 110 does not provide any functionality by itself, but instead uses the plug-ins module 154, which is configured to define the three plug-in categories with three separate plug-ins. The first, the checker module 202, the second, the validator module 204, and the third, the action module 206. The checker module or plug-in 202 has the task to return a certain value. The validator plug-in or module has the task to accept a value coming from the checker module 202, compare the value to something else and to return the status of this validation operation. The third, action module 206 performs an action or task.

A rule is configured to follow a simple syntax: 'checker' 'operator' 'validator': 'action0', 'action1' . . . . This simply means that when this rule is deployed, the monitoring-tracing engine 110 launch an instance of 'checker' and compares the returned value to 'validator', if the result of the 'checker' 'operator' 'validator' is true, 'action0', 'action1' will be launched, if the result of the first part is false; the monitoring-tracing engine 110 does not launch the actions. The 'validator' field may be a static value as well. An Example of a rule is indicated below:
   disk_usage_in_percent>=90: send_event, rotate_logs
   disk_usage_in_percent>=90: send_event, remove_logs
Defining the multiple rules, even by using the same checker module 202 is possible, further extending the flexibility of the system. The monitoring-tracing engine 110 (FIG. 1) can either periodically run these rules to oversee operations or run them all once to act as a health-check or diagnostic run.

Combining these concepts, it becomes easy to define a new 'situation' to monitor and act on. The monitoring-tracing engine 110 has an unexpected favorable result as it serves as a diagnostic/health-check system, but the monitoring-tracing engine 110 may also serve to monitor action-based events, reducing development time.

Figure 3:
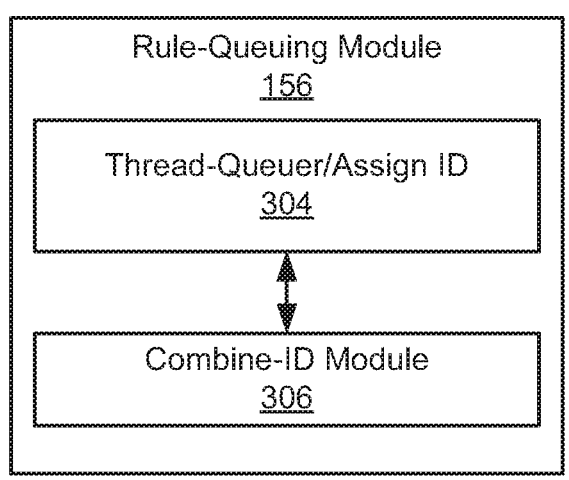
FIG. 3 is a block diagram illustrating an example rule-queuing module within the monitoring engine for tracing multi-threaded asynchronous logging.

Referring now to FIG. 3, the present system 100 also addresses multi-threading and asynchronous logging functionalities within a cloud infrastructure. The monitoring-tracing engine 110 (FIG. 1) represents a rule-based system that works with specific plug-ins (that define rules), as illustrated by the rule-queuing module 156, which comprises a thread-queuer/assign ID module 304 and a combine-ID module. The thread-queuer/assign ID module 304 identifies each step (or thread) in a particular rule and executes functionality for assigning a unique identification (ID) to each thread or step. The combine-ID module 306 generates a unique-combined identification that combines the three identifications (IDs) to create a unique identification for that rule operation. Other operations using the same code may yield other identifications (IDs), making the multi-threaded process (involving various steps or threads) easy to follow as illustrated below.

Example

An example process identifies and illustrates three threads: 'A', 'B' and 'C', 'A' and 'b' are the same code but are separately identified as they are assigned a different identification (ID). Each of the three threads spawn two other threads 'AY', 'AZ', 'BY', 'BZ', 'CY', 'CZ'. For these threads, the main process log file may appear as below:
thread A: ID 'AAAAAA' assigned
thread B: ID 'BBBBBB' assigned
thread C: ID 'CCCCCC' assigned
[BBBBBB] spawning new thread with id 'BZBZBZ'
[AAAAAA] spawning new thread with id 'AYAYAY
[CCCCCC] spawning new thread with id 'CYCYCY'
[AAAAAA] spawning new thread with id 'AZAZAZ'
[BBBBBB] spawning new thread with id 'BYBYBY'
[CCCCCC] spawning new thread with id 'CZCZCZ'
[BBBBBB-BYBYBY] doing something 0, assigning id 'BYCBYC'
[CCCCCC-CYCYCY] doing something 0, assigning id 'CYACYA'
[BBBBBB-BYBYBY] doing something 2, assigning id 'BYABYA'
[CCCCCC-CYCYCY] doing something 1, assigning id 'CYBCYB'
[AAAAAA-AYAYAY] doing something 0, assigning id 'AYAAYA'
[AAAAAA-AYAYAY] doing something 1, assigning id 'AYBAYB'
[BBBBBB-BYBYBY] doing something 1, assigning id 'BYBBYB'
[CCCCCC-CYCYCY] doing something 2, assigning id 'CYCCYC'
[AAAAAA-AYAYAY-AYBAYB] result of thread AAAAAA
spawning AYAYAY doing AYBAYB
[CCCCCC-CYCYCY-CYCCYC] result of thread CCCCCC spawning CYCYCY doing CYCCYC
etc. . . .

Even though the threads all log into the same file in a non-linear fashion (asynchronously), by this mechanism of identifying, it is logical to follow the flow of events with ease, by referring to the combined ID in the log file. By using this technique, it is relatively easy to follow specific log messages in a log file and to display them in a structured way in a user interface or to use it to simplify troubleshooting. This application may be used in any multi-threaded application with ease.

Figure 4:
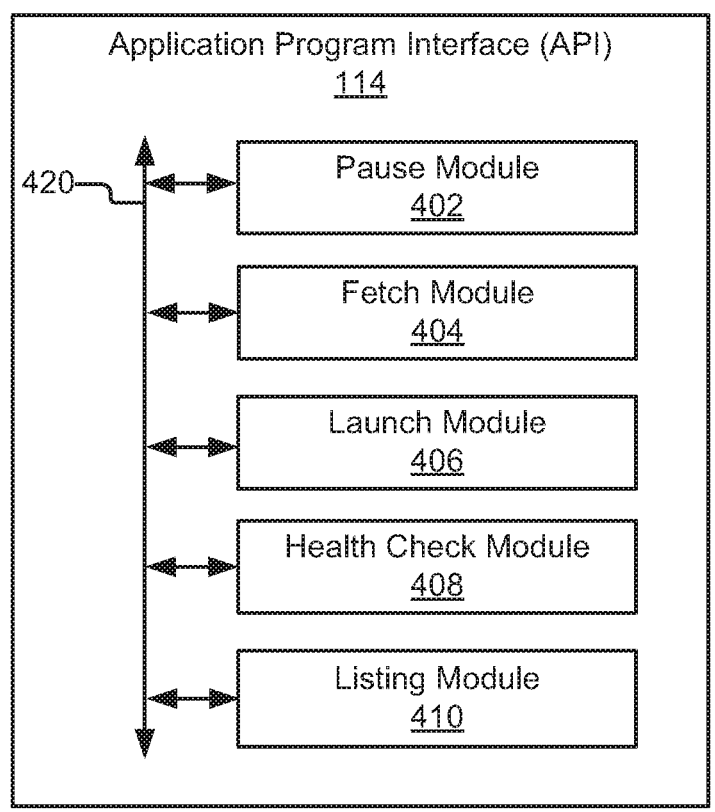
FIG. 4 is a block diagram illustrating an example Application Program Interface (API).

Referring now to FIG. 4, the Application Program Interface (API) 114 has a pause module 402, a fetch module 404, a launch module 406, a health-check module 408, and a listing module 410, each connected to the other by a bus 420. Each of these modules represents the hardware/software required for executing functions (by rules) in the cloud infrastructure. The pause module 402 may execute pause functions on the instructions executed with respect to a particular rule or launching of a plug-in. The fetch module 404 may fetch results from earlier rule runs The launch 406 may execute a particular rule or deploy a plug-in. The health-check module 408 is configured to execute a diagnostics run. The listing module 410 may be configured to list the particular rules or plug-ins, each executable by the processor 104 (FIG. 1).

Figure 5:
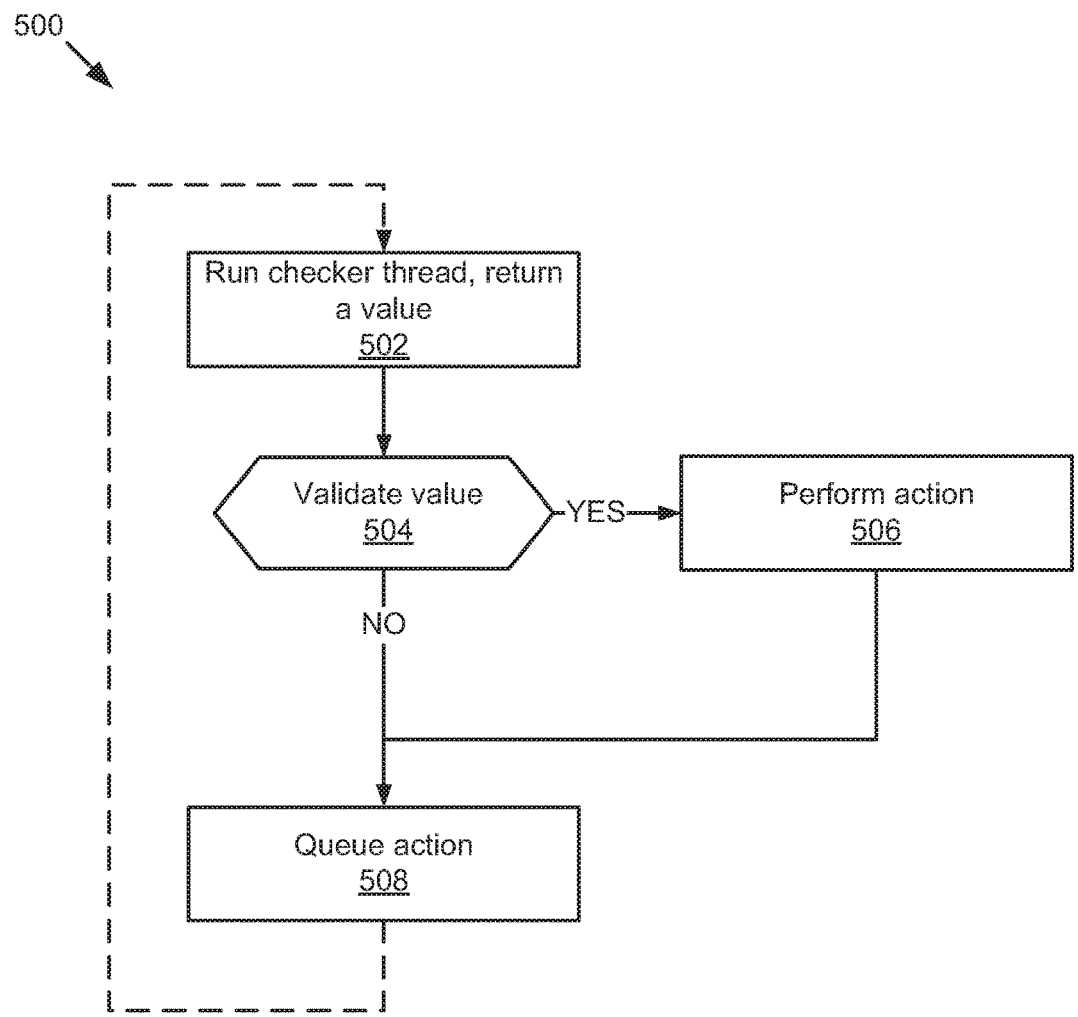
FIG. 5 is a flow chart illustrating an example monitoring protocol for a rule run, process, or operation performed by the monitoring engine.

Referring now to FIG. 5, the operations of some embodiments of the plug-ins module 154 are described. In one example, as illustrated by process 500, configuring a rule follows a simple syntax: 'checker' 'operator' 'validator': 'action0', 'action 1'. When this rule is deployed, the monitoring-tracing engine 110 launches an instance of the 'checker' and compares the returned value to the 'validator', and if the result of 'checker' 'operator' 'validator' is true, 'action0', 'action 1' is launched, and if the result of the first part is false; the plug-ins module does not launch the action. The process 500, at step 502, runs a checker thread to return a value. The process 500 proceeds to the next decision block 504, at which point, a determination is made if the value is validated. If the answer is affirmative, the process 500 proceeds to the next step 506, at which point, an action is performed. From there, the process 500 proceeds to the next block 508, for queueing the action. If the determination at the decision block 504 is negative, the process 500 proceeds to block 508, for queueing the action. From block 508, the process 500 may return to block 502, to run the next checker thread (as illustrated by the broken lines). In some instances, the 'validator' field may be a static value as well.

An example of a rule is as follows:
disk_usage_in_percent>=90: send_event_rotate_logs (this translates to 'if disk usage is greater than or equal to 90 percent: send an event and rotate the logs')
An example of multiple rules using the same checker is as follows:
disk_usage_in_percent>=70:send_event_rotate_logs
disk_usage_in_percent>=90:send_event, remove_logs
Defining multiple rules, even using the same checker, is possible, and further extends the flexibility of the system.

The monitoring-tracing engine 110 is configured to either periodically run these rules to act as a monitoring agent or may run them all at once to act as a health check or diagnostics module. By combining these concepts, it becomes very easy to define new 'situations' to monitor and act on. An unexpected yet favorable result of this monitoring-tracing engine is that it serves as a watchdog/health check system, yet may be used to implement action-based events, reducing development time. This system serves as a pluggable platform capable of providing the monitoring functionalities necessary.

Figure 6A:
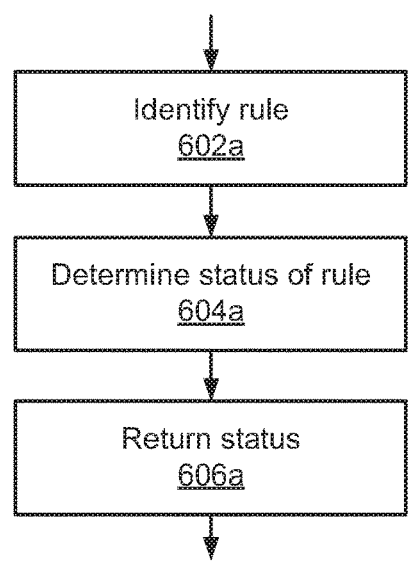
FIG. 6A is a flow chart illustrating an example process for identifying a rule and determining its status.
Figure 6B:
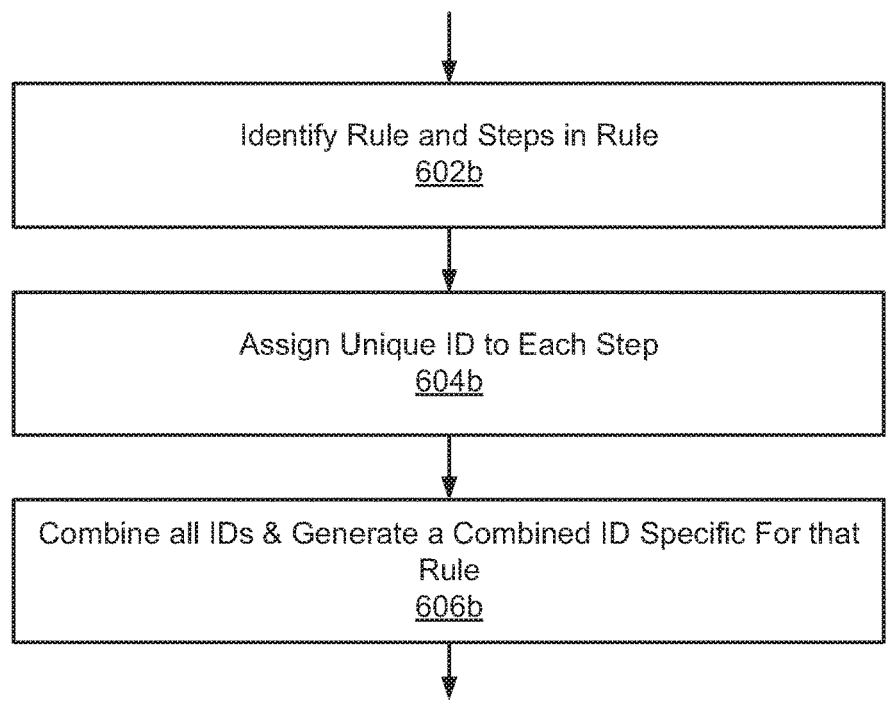
FIG. 6B is a flow chart illustrating an example method for generating individual IDs for each step in a rule and a combined ID for the rule to facilitate tracing of multi-thread operations relating to executing the rule.

Referring now to FIG. 6A, the run-checker thread 502a that returns the value includes the step of identifying the rule 602a, determining the status of the rule 604a, and returning the status 606a. Referring now to FIG. 6B, the run-checker 502b includes the step 602b, including one or more operations for identifying the rule and the steps in the rule. The process 502b proceeds to the next step 604b, including one or more operations for assigning a unique identification (ID) to each step. The process 502b proceeds to the next step 606b, including one or more operations for combining all identifications (IDs) and generating a combined identification (ID) specific for that rule.

Figure 7:
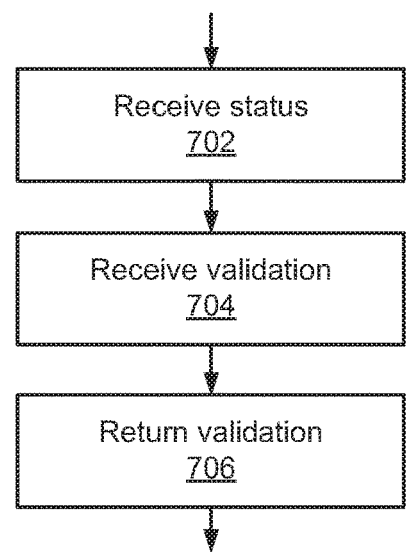
FIG. 7 is a flow chart illustrating an example validation protocol that receives a status report, receives validation and returns the validation.

Referring now to FIG. 7, the operations for validating the value are described in further detail. The operations include step 702, including one or more operations for receiving the status. The process 504 proceeds to the step 704 of receiving validation, including one or more steps for receiving validation. From 704, the process 504 proceeds to the next step 706, including one or more operations, configured for returning the validation.

Figure 8:
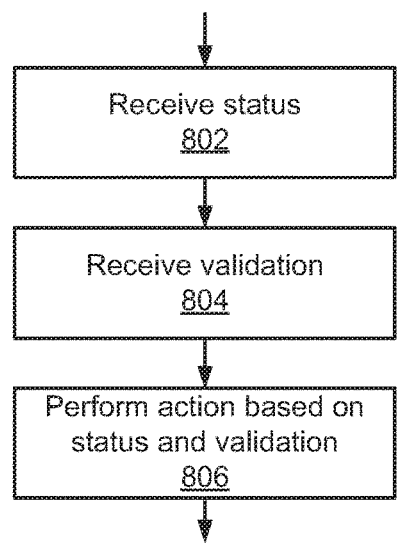
FIG. 8 is a flow chart illustrating an example protocol for performing an action based on a reported status and validation.

Referring now to FIG. 8, the steps of performing actions by plug-ins, illustrated by block 506 are further described. The process 506, proceeds to step 802, including one or more operations for receiving the status of a particular operation. From 802, the process 506 proceeds to step 804, including one or more operations for receiving validation (e.g., that the operation is performing without problem). From there, the process 506 may include one or more operations for performing an action (e.g., to correct a problem detected) based on the status and validation.

Figure 9A:
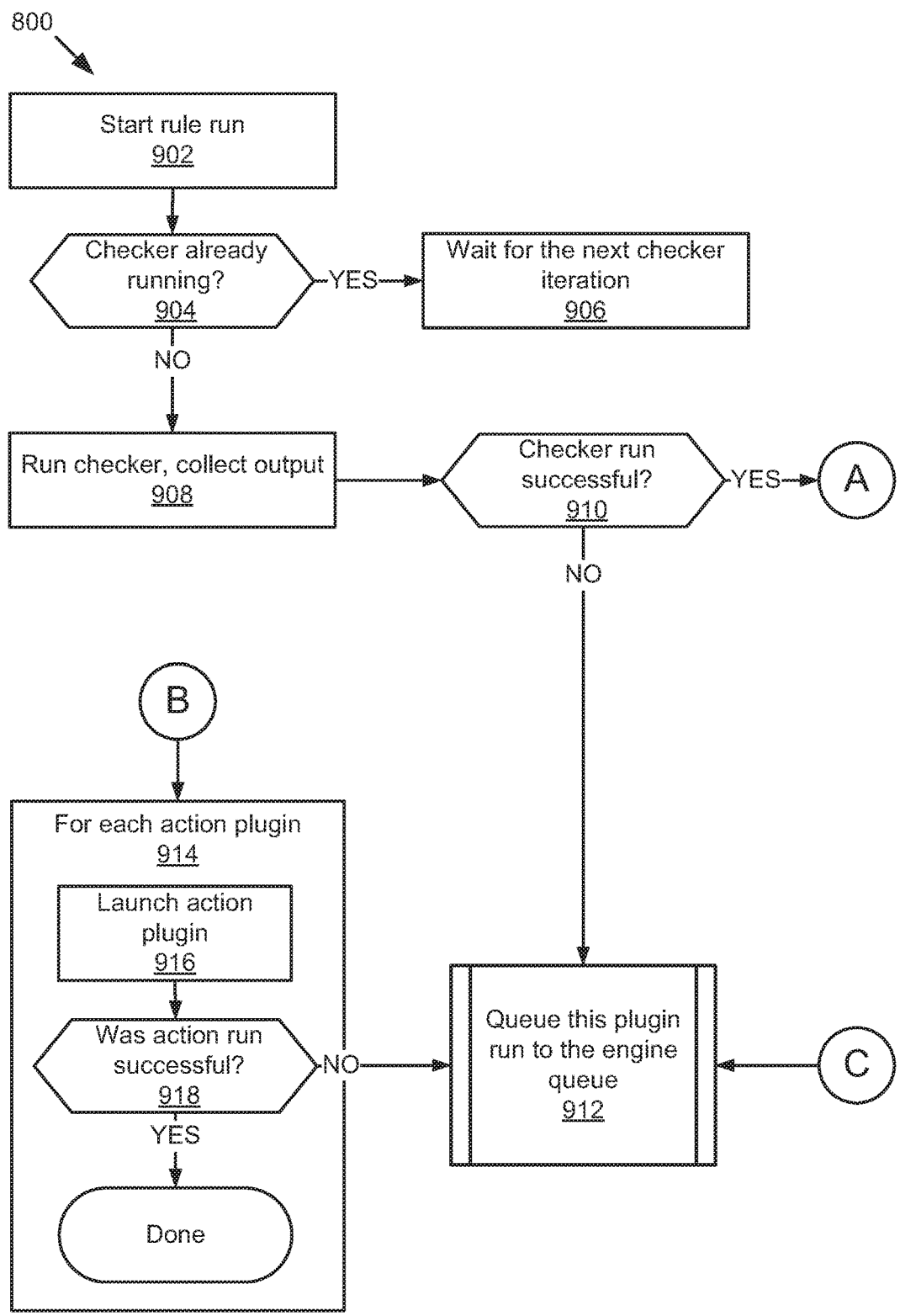
FIG. 9A is a first part of the flow chart illustrating an example rule run or process for executing a rule from checking to executing the rule.

Referring now to FIG. 9A, the process 800 of the rule-based system is described. The process begins by starting the rule run, at block 902. The process 800 includes the decision block 904, by which a determination is made to determine if the checker plug-in (executed by the checker module 202 in FIG. 2) is already running and performing its intended purpose. If the answer is affirmative the process proceeds to the next block of operations 906, by which the checker plug-in waits for the next checker iteration. If the answer output from decision block 904 is negative, the process 800 proceeds to the block 908, by which the checker plug-in is run and output is collected. The process 800 proceeds to a decision block 910 including one or more operations for determining if the checker run is successful. If the answer is affirmative, the process 800 proceeds to connector point A (connecting to continuing operations described in FIG. 9B). If the answer at decision block 910 is negative, the process 800 proceeds to the next block 912, at which point, the plug-in run is placed in queue for the queue for the monitoring-tracing engine 110.

Figure 9B:
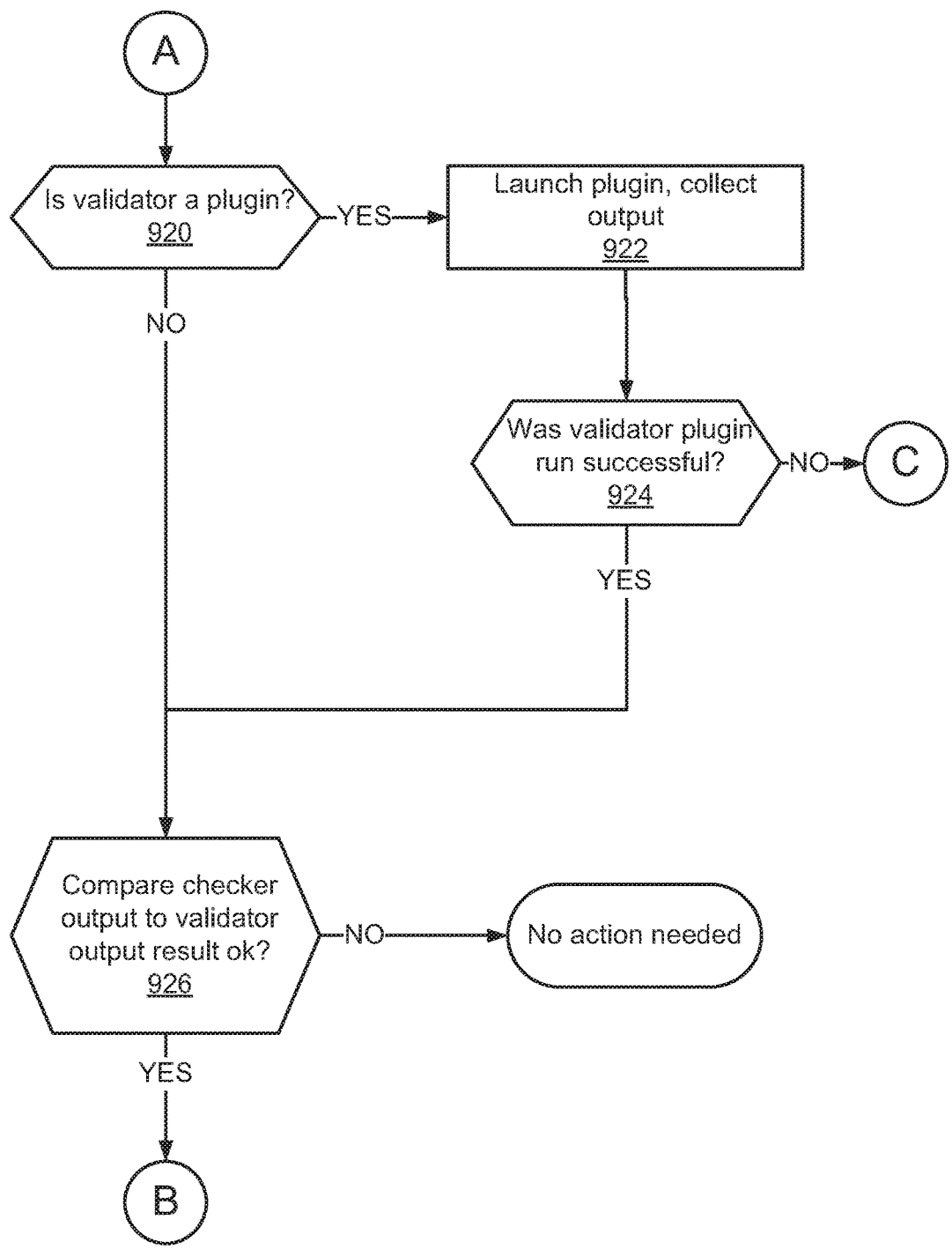
FIG. 9B is a second part of the flow chart illustrating the example process rule run or process.

Referring now to FIG. 9B, proceeding from connector point A, the process 800 proceeds to decision block 920, including one or more operations for determining if the validator is a plug-in. if the answer is affirmative, the process 800 proceeds to the next block 922, including one or more operations for launching the validator plug-in and collecting output data. From block 922, the process 800 proceeds to a next decision block 924, including one or more operations for determining if the validator plug-in run was successful. If the answer determined is negative, the process 800 proceeds to a connector C (connecting to block 912 in FIG. 9A). If the answer at decision block 924 is affirmative, the process 800 proceeds to the next decision block 926, including one or more operations for comparing the checker output (by the checker plug-in) to the validator output (by the validator plug-in) to determine if the result from the comparison meets a desired outcome. If the answer generated at this decision block 926 is negative, the process proceeds to connector B (connecting to block 914 in FIG. 9A). If the answer generated at decision block 926 is affirmative, it is determined that no action is required (e.g. to correct a problem detected by the monitoring engine 110).

In the depicted embodiments, the network 105 may connect to a cloud infrastructure (with cluster nodes) including a cloud computing system (not shown), which may include cloud storage including storage logic, a switch, and one or more storage devices. However, the present disclosure is not limited to this configuration, and a variety of different system environments and configurations can be employed and are within the scope of the present disclosure. Other embodiments may include additional or fewer components.

The systems and methods described above provide a highly reliable system for implementing cross device redundancy schemes. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), Erasable Programmable Read-Only Memories (EPROMs), Electrically Erasable Programmable Read-Only Memories (EEPROMs), magnetic or optical cards, flash memories including Universal Serial Bus (USB) keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, state machines, gate arrays, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

When the disclosed technologies are embodied in the general context of computer-executable instructions, the embodiments may comprise program modules, executed by one or more systems, computers, or other devices. Generally, program modules include routines, programs, objects, components, data structures, and the like, that perform particular tasks or implement particular abstract data types. The functionality of the program modules may be combined or distributed as desired in various embodiments.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein to create special purpose apparatus, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system comprising:
    a processor; and
    memory storing instructions that, when executed, cause the processor to:
        execute an application program interface to operate a monitoring engine configured to monitor a particular functionality within a software-based infrastructure based on a rule-based configuration;
        define, by the monitoring engine, three separate categories of plug-ins, the three separate categories of plug-ins including:
            a checker plug-in configured to return a value output after a checking operation;
            a validator plug-in configured to:
                receive the value output;
                compare the value output to a threshold standard; and
                return a status of a validation operation performed by the validator plug-in; and
            an action plug-in configured to perform an action responsive to the status of the validation operation indicating action is required;
        selectively launch a selected checker plug-in, a selected validator plug-in, and a selected action plug-in into the software-based infrastructure to monitor the particular functionality, wherein the selected checker plug-in, the selected validator plug-in, and the selected action plug-in comprise a rule for selectively executing a selected action in the selected action plug-in; and
        determine whether to execute the selected action in the selected action plug-in based on the status of the validation operation of the selected validator plug-in.

2. The system of claim 1, wherein the monitoring engine comprises a plug-ins module configured to use the selected checker plug-in for defining multiple rules.

3. The system of claim 1, wherein a plug-ins module comprises:
    a checker module for adding the selected checker plug-in;
    a validator module for adding the selected validation plug-in; and
    an action module for adding the selected action plug-in.

4. The system of claim 1, further comprising:
    a first module configured to:
        identify a plurality of logging threads in the rule; and
        assign an identification to each of the plurality of logging threads.

5. The system of claim 4, further comprising:
    a second module configured to generate a unique-combined identification for the plurality of logging threads.

6. The system of claim 1, wherein the monitoring engine is further configured to:
    responsive to executing the selected action for the particular functionality identified in the software-based infrastructure:
        determine whether the selected action was not successful; and
        responsive to determining the selected action was not successful, queue the rule to run on a next iteration in the monitoring engine.

7. A method comprising:
    executing an application program interface to operate a monitoring engine configured to monitor a particular functionality within a software-based infrastructure based on a rule-based configuration;
defining three separate categories of plug-ins, including:
a checker plug-in configured to return a value output from a particular situation;
a validator plug-in configured to:
receive the value output;
compare the value output to a threshold standard; and
return a status of a validation operation performed by the validator plug-in; and
an action plug-in configured to perform an action responsive to the status of the validation operation;
generating a selected checker plug-in, a selected validator plug-in, and a selected action plug-in to formulate a rule;
launching the selected checker plug-in, the selected validator plug-in, and the selected action plug-in in sequence into the software-based infrastructure to monitor the particular functionality; and
determining whether to execute the selected action in the selected action plug-in based on the status of the validation operation of the selected validator plug-in.

8. The method of claim 7, wherein the monitoring engine comprises a plug-ins module configured to launch the selected checker plug-in, the selected validator plug-in, and the selected action plug-in in sequence responsive to determining a need for each of the selected checker plug-in, the selected validator plug-in, and the selected action plug-in.

9. The method of claim 7, wherein a plug-ins module comprises:
a checker module configured to generate the selected checker plug-in;
a validator module configured to generate the selected validation plug-in; and
an action module configured to generate the selected action plug-in.

10. The method of claim 7, further comprising:
identifying a plurality of logging threads in the rule; and
assigning an identification to each of the plurality of logging threads.

11. The method of claim 10, further comprising:
generating a unique-combined identification for the plurality of logging threads; and
assigning the unique-combined identification to the plurality of logging threads.

12. The method of claim 7, further comprising:
determining the status of the validation operation in the selected validation plug-in; and
executing, responsive to the status of the validation operation, the selected action of the selected action plug-in in the software-based infrastructure.

13. The method of claim 12, further comprising:
determining whether the selected action was not successful; and
queuing, responsive to determining the selected action was not successful, the rule to run on a next iteration in the monitoring engine.

14. A system comprising:
means for executing an application program interface to operate a monitoring engine configured to monitor a particular functionality within a software-based infrastructure based on a rule-based configuration;
means for defining three separate categories of plug-ins, including:
a checker plug-in configured to return a value output;
a validator plug-in configured to:
receive the value output;
compare the value output to a threshold standard; and
return a status of a validation operation performed by the validator plug-in; and
an action plug-in configured to perform an action responsive to the status of the validation operation indicating action is required; and
means for adding a selected checker plug-in, a selected validator plug-in, and a selected action plug-in into the software-based infrastructure to monitor the particular functionality, wherein the selected checker plug-in, the selected validator plug-in, and the selected action plug-in comprise a rule for selectively executing a selected action in the selected action plug-in; and
means for determining whether to execute the selected action in the selected action plug-in based on the status of the validation operation of the selected validator plug-in.

15. The system of claim 14, wherein the monitoring engine comprises a plug-ins module configured to deploy the selected checker plug-in, the selected validator plug-in, and the selected action plug-in in sequence.

16. The system of claim 15, further comprising:
means for defining a first task for the selected checker plug-in;
means for defining a second task for the selected validator plug-in; and
means for defining a third task for the selected action plug-in.

17. The system of claim 15, further comprising:
means for identifying a plurality of logging threads in the rule; and
means for assigning an identification to each of the plurality of logging threads.

18. The system of claim 17, further comprising:
means for generating a unique-combined identification for the plurality of logging threads; and
means for assigning the unique-combined identification to the plurality of logging threads.

19. The system of claim 14, further comprising:
means for determining the status of the validation operation in the selected validation plug-in; and
means for executing, responsive to the status of the validation operation, the selected action in the software-based infrastructure.

20. The system of claim 19, further comprising:
means for determining if the selected action was not successful; and
means for queuing, responsive to determining the selected action was not successful, the rule on a next iteration to run in the monitoring engine.

* * * * *